United States Patent
Tahara

(10) Patent No.: US 6,532,242 B1
(45) Date of Patent: *Mar. 11, 2003

(54) METHOD FOR ENCODING, EDITING AND TRANSMITTING DIGITAL SIGNALS

(75) Inventor: Katsumi Tahara, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/896,511

(22) Filed: Jun. 11, 1997

(30) Foreign Application Priority Data

Jun. 13, 1996 (JP) .............................. 8-152534

(51) Int. Cl.[7] .................................. H04N 9/74

(52) U.S. Cl. ...................... 370/487; 370/527; 370/537; 348/584

(58) Field of Search ................................ 348/426, 432, 348/473, 598; 370/345, 487, 490, 498, 527, 537, 538, 540; 455/6.3

(56) References Cited

U.S. PATENT DOCUMENTS

| | | | | | |
|---|---|---|---|---|---|
| 5,534,944 A | * | 7/1996 | Egawa et al. | ............... | 348/432 |
| 5,793,431 A | * | 8/1998 | Blanchard | .................... | 348/473 |
| 5,859,660 A | * | 1/1999 | Perkins et al. | ............... | 348/598 |
| 5,912,709 A | * | 6/1999 | Takahashi | .................... | 348/473 |
| 5,949,487 A | * | 9/1999 | Blanchard | .................... | 348/403 |

* cited by examiner

Primary Examiner—Wellington Chin
Assistant Examiner—Frank Duong
(74) Attorney, Agent, or Firm—Frommer Lawrence & Haug LLP; William S. Frommer; Darren M. Simon

(57) ABSTRACT

A digital signal encoding, editing and transmitting method enabling seamless coupling of plural video bitstreams without causing disruption of a decoder buffer. In coupling a second bitstream from an encoding unit 20 to the trailing end of a first bitstream from an encoding unit 10, an encoding unit 12 imposes limitations in encoding for securing a data buffer volume required for startup of the second bitstream in the vicinity of the trailing end of the first bitstream responsive to the control signal from a terminal 14, while an encoding unit 22 imposes limitations in encoding for securing a data buffer volume required for startup of the second bitstream in the vicinity of the leading end of the second bitstream responsive to the control signal from a terminal 24.

8 Claims, 8 Drawing Sheets

METHOD FOR ENCODING, EDITING AND TRANSMITTING DIGITAL SIGNALS

BACKGROUND OF THE INVENTION

1. Field of the Invention

This invention relates to a digital signal encoding, editing and transmitting method applied with advantage to recording moving picture signals or acoustic signals on recording media, such as a magneto-optical disc or a magnetic tape, reproducing and displaying the recorded signals on a display, transmitting moving picture signals or acoustic signals over a transmission channel from a transmitter to a receiver in a teleconferencing system, television telephone system or in a broadcasting system, and receiving and displaying the transmitted signals by the receiver.

2. Description of the Related Art

Recently, it has become customary to compress picture signals or acoustic signals using a pre-set reference standard to generate digital bitstream data and to transmit the generated data, optionally in a multiplexed form.

An illustrative example of the above reference standard is the Moving Picture Coding Experts Group (MPEG) standard. The MPEG is an acronym of a research organization for encoding moving pictures for storage of International Organization for Standardization/International Electrotechnical Commission, Joint Technical Committee 1/Sub Committee 29 (ISO/IEC JTC1/SC29). The MPEG1 standard and the MPEG2 standard are ISO11172 and ISO13818, respectively. In these international standards, ISO11172-1 and ISO13818-1 are standardized in connection with multimedia multiplexing, while ISO11172-2 and ISO13818-2 are standardized in connection with video and ISO11172-3 and ISO13818-3 are standardized in connection with audio.

In ISO11172-2 and ISO11172-2, as picture compressing encoding standard, picture signals are encoded (compressed) on a picture basis (on the frame basis or on the field basis) by exploiting picture correlation in the time direction and in the spatial direction.

FIG. 1 shows schematics of an entire device used for encoding (compressing) picture signals for generating an encoded digital bitstream and for decoding the resulting bitstream via a recording media or over a transmission media.

In FIG. 1, picture signals fed to an input terminal 101 are sent to an encoding unit 102 designed in meeting with the above-mentioned MPEG1 (ISO11172-2 ) or MPEG2 (ISO13818-2 ). Although it is each picture that operates as the basis for compression, the size of the encoded (compressed) picture data is not constant. Therefore, a transmission buffer 103 is provided on an output stage and the stored amount in the buffer is fed back to the encoding unit for adjusting the amount of the codes of the picture in order to prevent overflow/underflow of the transmission buffer 103. By adjusting the code volume in this manner, a bitstream is outputted at a stable bit rate from an output stage of the transmission buffer 103.

The output encoded bitstream is sent to a decoding side via a media 105 such as a transmission media or storage media. The decoding side performs an operation reversed from that performed on the encoding side. That is, the bitstream, sent at the constant rate, is received by a reception buffer 106. A decoding unit 107 then reads out the bitstream from the reception buffer 106 in terms of encoded picture data (accessing unit or AC) as a read-out unit. Therefore, readout from the reception buffer 106 becomes intermittent. The read-out picture data are restored by the decoding unit 107 into original picture data which is outputted at an output terminal 108.

FIG. 2 illustrates the operation of the reception buffer (decoder buffer) 106 on the decoding side of FIG. 1. Thus, FIG. 2 illustrates the rate of storage of the picture bitstream entering the reception buffer 106. The reception buffer 106 is fed with picture data at the pre-set constant rate as indicated by a rightwardly rising straight line. Picture data P1, P2, P3, . . . are basically extracted from the buffer at pre-set decoding time points $t_1$, $t_2$, $t_3$, . . . in terms of the encoding unit (accessing unit AU) as a unit of extraction. Thus the buffer occupying amount (amount of storage of the buffer) delineates a serrated trajectory as shown in FIG. 2.

The contents of the prescriptions of the above-mentioned standards ISO11172-2 or ISO13818-2 Annex C refer to encoding without causing overflow or underflow of the decoder buffer. These conditions represent indispensable conditions in recognizing the bitstream as meeting the above-mentioned MPEG conditions.

When handling plural series of picture signals encoded in accordance with the above-mentioned MPEG1 (ISO11172-2) or MPEG2 (ISO13818-2) standards, it is generally difficult to couple plural bitstreams independently encoded in different systems. In particular, so-called seamless junction, that is coupling the pictures continuously at the coupling point without picture standstill (freezing) is practically impossible in the case of bitstreams generated without any limitations.

FIG. 3 shows an instance in which two bitstreams are simply coupled together. In the instance of FIG. 3, decoding of the next second bitstream $BS_2$ is started immediately after the end of display of a temporally previous first bitstream $BS_1$. In general, a queuing time, termed start-up delay, for starting the decoding after storage of a certain volume of data in a buffer, is required at the leading end of a bitstream. Thus, at the junction point J, the decoding/display of the next decoded picture is delayed for a time corresponding to this delay, thus producing the phenomenon in which the displayed frame comes to a standstill for the duration of several frames. Thus, in such case, the so-called seamless reproduction cannot be realized. In FIG. 3, data supply is stopped at a time point $x_1$, and the last picture of the first bit stream $BS_1$ is extracted at the junction point J. At a time point $x_2$, the frame is at a standstill (frozen) for coupling the bitstreams and, at the next time point $x_3$, the first picture of the second bitstream $BS_2$ is extracted.

FIG. 4 shows an instance in which, for seamlessly reproducing bitstreams similar to those shown in FIG. 3, data input to the buffer is caused to occur at a time point earlier by the above-mentioned start-up delay. Since priority is placed on the seamless reproduction in the instance of FIG. 4, the leading picture of the temporary posterior bitstream $BS_2$ is decoded after 1/FR, where FR is the frame rate, as from the decoding of the last picture of the temporarily prior bitstream $BS_1$ (junction point $x_2$ in FIG. 4). In this case, since the bitstream $BS_2$ enters the buffer temporally before decoding of the last picture of the bitstream $BS_1$ (picture extracted at the junction point J), the amount of data storage in the decoder buffer overflows at the time of decoding of the last picture of the bitstream $BS_1$ (junction point J).

Thus, in general, it is practically impossible to realize seamless coupling of bitstreams of picture signals encoded with the conventional encoding method.

SUMMARY OF THE INVENTION

It is therefore an object of the present invention to provide a digital signal encoding, editing and transmitting method whereby two bitstreams of picture signals can be coupled seamlessly without overflow or underflow of the decoder buffer or without interposition of still pictures.

In one aspect, the present invention provides a digital signal encoding method of encoding a bitstream of digital signals, wherein, in encoding, pre-set first limitations are imposed on a decoder buffer occupying volume in the vicinity of the trailing end of a first temporally previous bitstream of plural encoded bitstreams desired to be connected together.

According to the present invention, pre-set second limitations are imposed in encoding on a buffer occupying volume in the vicinity of the leading end of a second temporally posterior bitstream of plural encoded bitstreams desired to be connected together.

The first and second limitations are those for securing the decoder buffer volume required for startup of the temporarily posterior second bitstream. More specifically, the first limitations are such that, if the buffer volume necessary for startup of the temporary posterior second bitstream is $\alpha$, the encoding bit rate is $R_B$ and the extraction time from the buffer of the last picture of the first bitstream is T, limitations on the buffer occupying volume are started at a time point of $T-(\alpha/R_B)$ and, if a buffer occupying volume for this time point t=0 is BO(t) and the total capacity of the buffer is BF, limitations represented by $BO(t)=BF-R_B \times t$ are imposed in encoding the vicinity of the trailing end of the first bitstream.

The second limitations are such that, if the time of extraction from the buffer of the leading picture of the temporarily posterior second bitstream is T' and the frame rate is RF, the limitations of $\beta < \alpha$ are imposed in encoding the vicinity of the leading end of the second bitstream, where $\beta$ is the buffer occupying volume at a time point $T'-1' R_F$ and $\alpha$ is the buffer volume necessary for startup of the second bitstream.

In coupling the first and second bitstreams, encoded under the specified limitations, a code sequence_end_code appended to the trailing end of the first bitstream, encoded under limitations, is deleted, and stuffing bits for ($\alpha-\beta$), where $\alpha$ and $\beta$ are the buffer volumes specified as above, and for the deleted code sequence_end_code, are appended to the bitstream.

DESCRIPTION OF THE PREFERRED EMBODIMENTS

Figure 1:
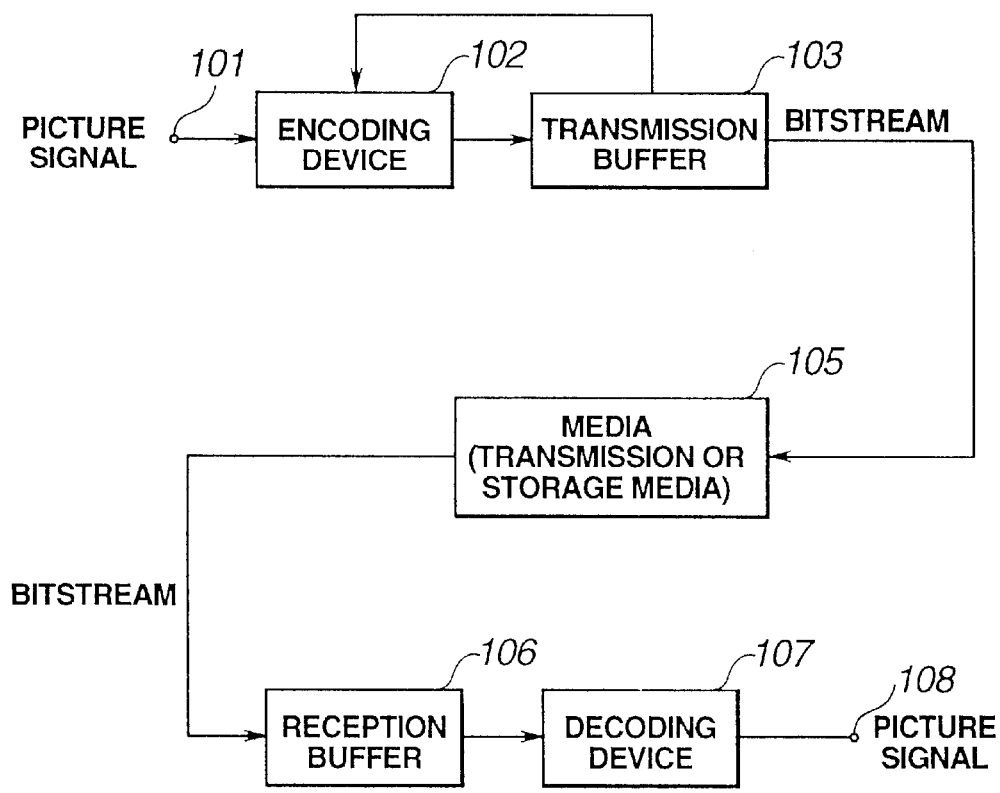
FIG. 1 is a block diagram showing a schematic structure of a system including a picture signal encoding device and a picture signal decoding device.

Referring to the drawings, preferred embodiments of the present invention will be explained in detail.

Figure 5:
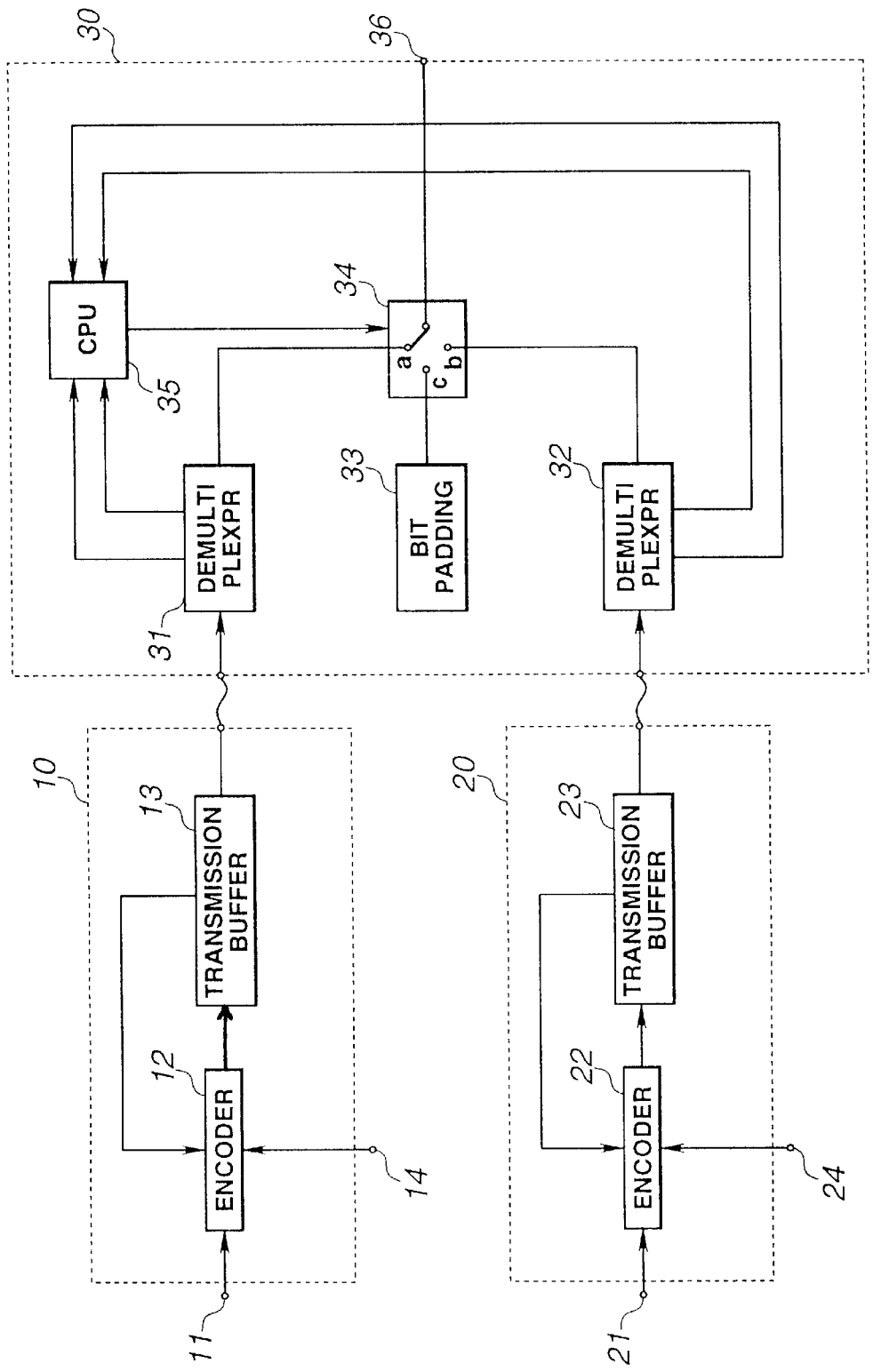
FIG. 5 is a schematic block diagram of a system for coupling bitstreams of two distinct encoding units for illustrating an embodiment of the present invention.

FIG. 5 illustrates a preferred embodiment of the present invention, in which it is assumed that a second bitstream, obtained on encoding second picture signals entering an input terminal 21 by an encoder 20, is coupled to the trailing end of a first bitstream obtained on encoding first picture signals entering an input terminal 11 by an encoder 10.

The first picture signals, supplied to the input terminal 11 of the encoding unit 10 of FIG. 5, are sent to an encoder 12 arranged in meeting with the above-mentioned MPEG1 (ISO11172-2) or MPEG2 (ISO13818-2) for encoding (compression) so as to be taken out as a first bitstream. In this case, each picture represents a unit of compression. However, since the size of the encoded picture data is not constant, a transmission buffer 13 is provided in an output stage. The data occupying this transmission buffer is fed back to the encoder for adjusting the picture code volume for preventing overflow/underflow of the transmission buffer 13. The picture signals are encoded so that limitations are imposed on the amount of storage of the decoder buffer in the vicinity of the trailing end of the first bitstream obtained on encoding the first picture signals. In particular, limitations for securing a decoder buffer volume required for startup of the second bitstream connected to the trailing end of the first bitstream are imposed on the buffer occupying volume in the vicinity of the trailing end of the first bitstream. The contents of these limitations, applied responsive to a control signal from a terminal 14, will be explained subsequently by referring to FIG. 6.

The second picture signals, supplied to an input terminal 21 of the encoder 20, are sent to an encoder 22 constructed in accordance with the MPEG1 (ISO11172-2) or MPEG2 (ISO13818-2) for encoding (compression) to form the second bitstream. A transmission buffer 23 is provided in an output stage and the data occupying this transmission buffer is fed back to the encoder for adjusting the picture code volume for preventing overflow/underflow of the transmission buffer 23. At this time, limitations are imposed on the amount of storage of the buffer in the vicinity of the trailing end of the second bitstream. In particular, limitations are imposed for securing a buffer volume required for startup of the second bitstream. The contents of these limitations, applied responsive to a control signal from a terminal 24, will be explained subsequently by referring to FIG. 7.

The first bitstream from the encoding unit 10 and the second bitstream from the encoding unit 20 are coupled in a bitstream coupling unit 30 in the order of the first bitstream and the second bitstream so as to be outputted at an output terminal 36. This coupling is explained later with reference to FIG. 8.

Specifically, by encoding the temporally previous first bitstream in the encoding unit 10 with certain limitations imposed on the buffer occupying volume in the vicinity of the trailing end of the first bitstream coupled to the second bitstream in the coupling unit 30, and by encoding the temporally posterior second bitstream in the encoding unit 20 with certain limitations imposed on the buffer occupying volume in the leading portion thereof, the two bitstreams can be coupled together so that the pictures can be continuously displayed without freezing in keeping with the rule of video buffer verifier (VBV) prescribed in the MPEG1 (ISO11172-2) or MPEG2 (ISO13818-2).

That is, since seamless coupling at the junction point possibly leads to overflow of the decoder buffer as explained with reference to the above-described prior-art example, the buffer volume required for startup required for seamless junction is taken into account in advance for performing coding control ahead and at back of the coupling point.

Figure 6:
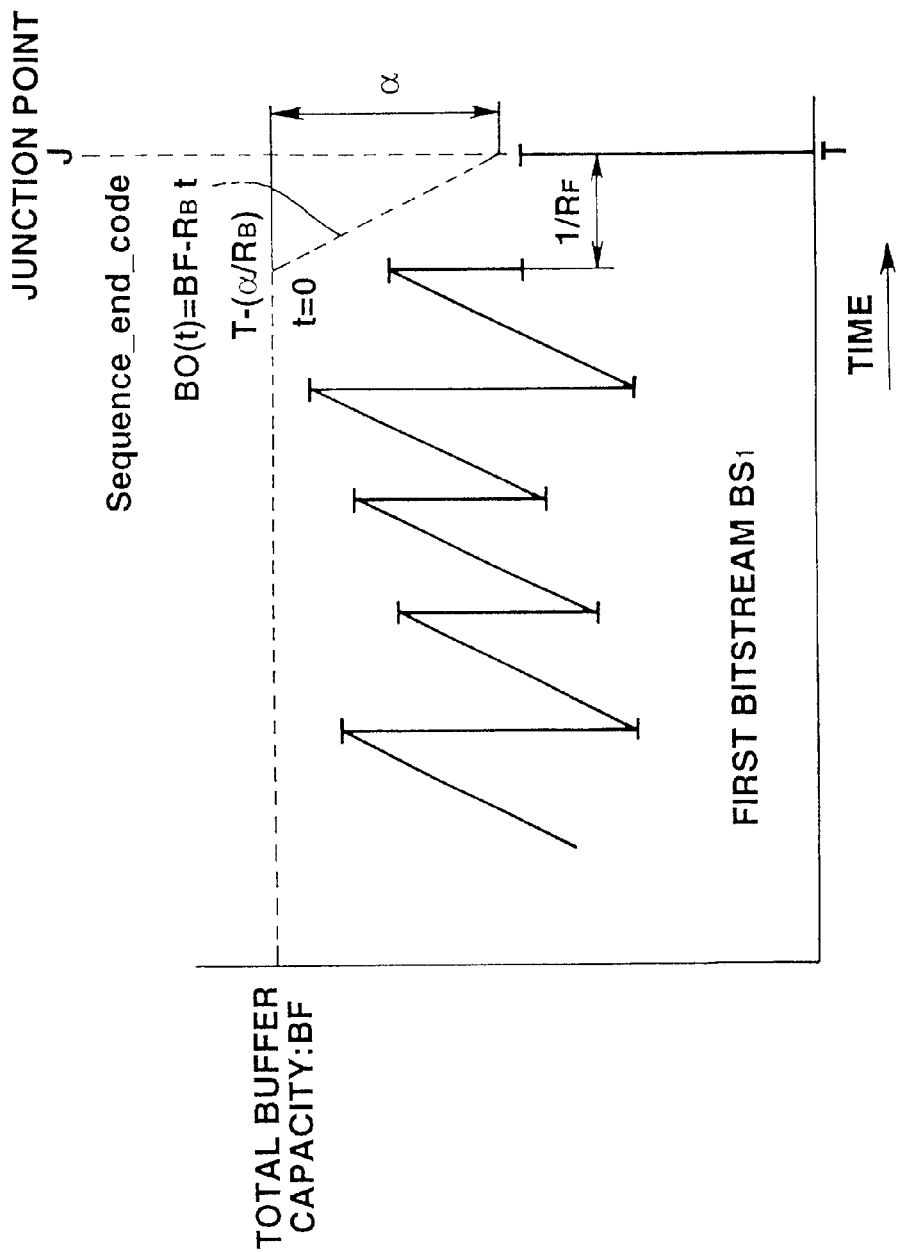
FIG. 6 illustrates limitation in encoding the first bitstream ahead of a junction point in the embodiment of the present invention.

Specifically, the bit rate near the end of the first bitstream $BS_1$ lying ahead of the junction point J is limited as shown in FIG. 6. It is assumed that the buffer volume required for startup in case of seamless coupling of a pre-set backward second bitstream to the first bitstream is α. This value α can be set to a practically proper value. It is also assumed that the encoding bit rate is $R_B$, the total capacity of the buffer is BF and the last picture extraction time from the buffer is T.

In this case, with the time point T of the junction point, the limitations imposed on the buffer occupying volume are such that the start time is $T-(\alpha/R_B)$. It is assumed that this start time is represented as t=0, and time proceeds in the positive direction. Then, since the buffer occupying volume BO(t) is represented as a function of t, limitations corresponding to $$BO(t)=BF-R_B \times t$$

are imposed. Under these limitations, the vicinity of the terminal end of the bitstream temporarily prior to the junction is encoded. These represent limitations on the first bitstream $BS_1$ prior to the junction point. In FIG. 5, a control signal from the terminal 14 is applied to the encoder 12 for imposing the above-mentioned limitations during encoding of the vicinity of the trailing end of the bitstream.

The bit rate in the vicinity of the leading end of the second bitstream $BS_2$ positioned at back of the junction point J is limited in similar manner. That is, the bit rate on startup is limited so that the buffer occupying volume before $1/R_F$ of the display time point of the first frame is smaller than α. That is, with the extraction time T' of the leading picture of the backward second bitstream $BS_2$ from the buffer, and with the frame rate of $R_F$, limitations are imposed s that β<α, where β is the buffer occupying volume at a time $(T'-1/R_F)$ and α is the buffer volume required for startup in case of seamless coupling of the second bitstream $BS_2$. Under these limitations, the leading portion of the backward side second bitstream $BS_2$ is encoded. In FIG. 5, the control signal from the terminal 24 is supplied to the encoder 22 for imposing the above-mentioned limitations at the time of encoding of the vicinity of the leading end of the bitstream.

Figure 7:
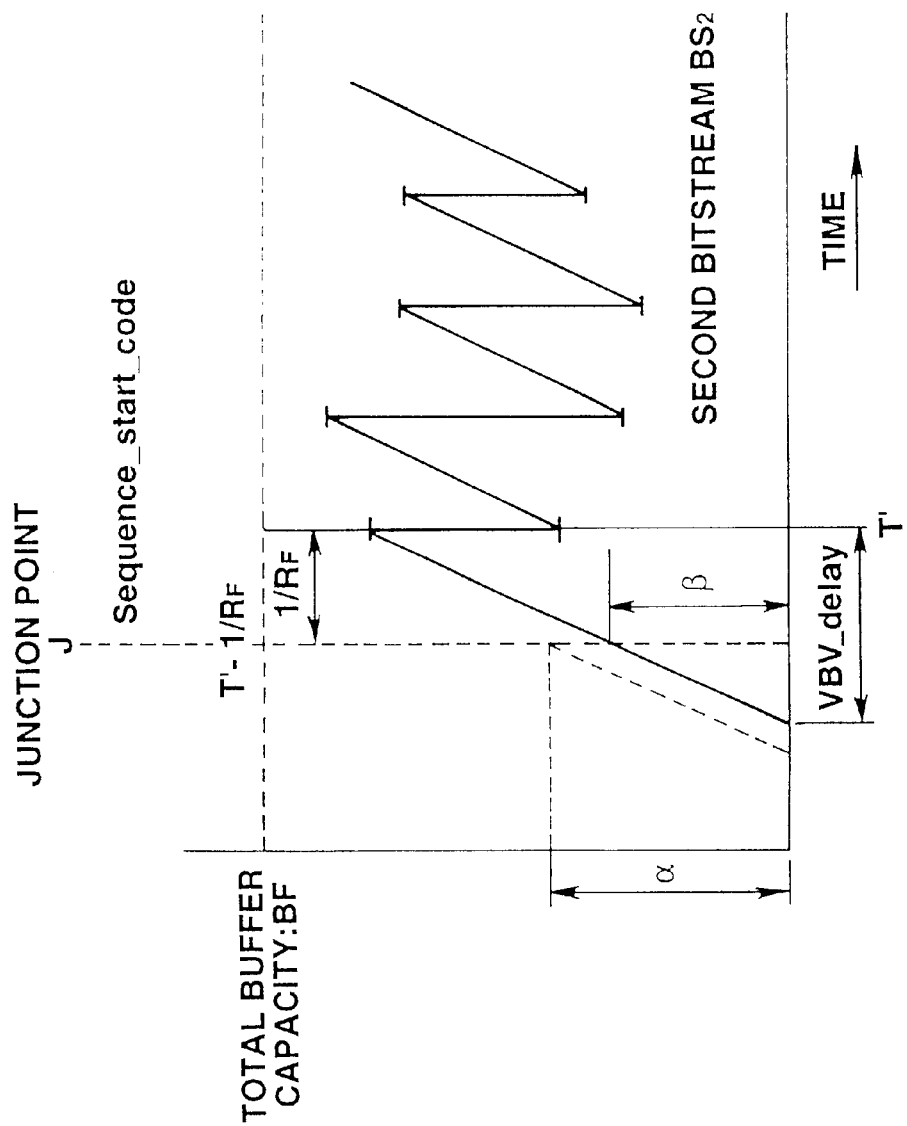
FIG. 7 illustrates limitation in encoding the second bitstream ahead of a junction point in the embodiment of the present invention.

In FIG. 7, VBV_delay is the buffer storage volume in time as required for the picture extracted in the decoder side buffer under the prescriptions of the video buffer verifier (VBV) of the MPEG1 (ISO11172-2) or MPEG2 (ISO13818-2). The first display unit picture is extracted from the buffer and displayed at a time T' when the time period VBV_delay has elapsed since the bitstream starts to be supplied to the decoder.

Figure 8:
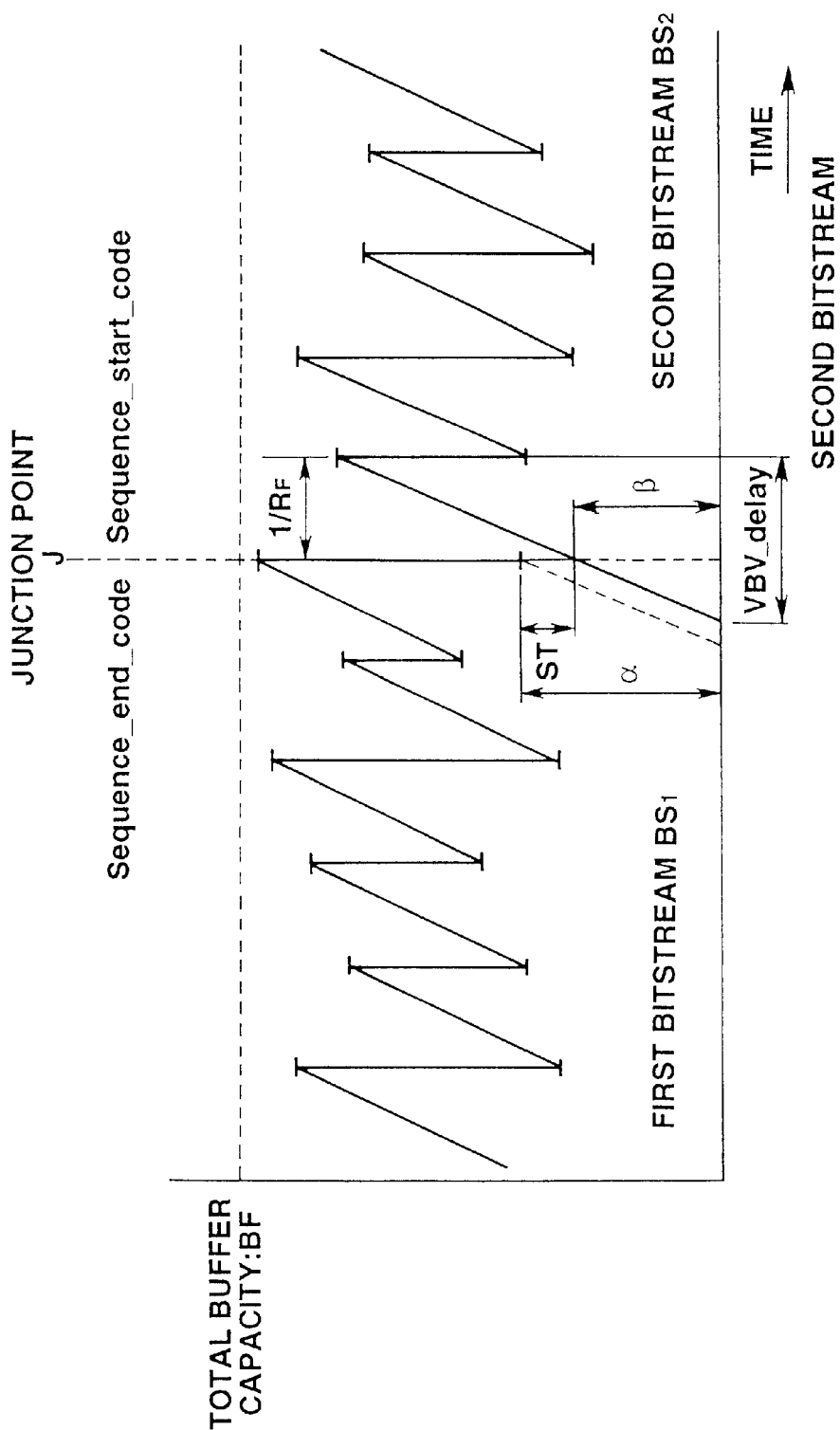
FIG. 8 illustrates coupling of the first and second bitstreams in the embodiment of the present invention.

Referring to FIG. 8, an illustrative example, in which the first and second bitstreams, encoded under limitations as explained with reference to FIGS. 6 and 7, are sent to and coupled together in the bitstream coupling unit 30 of FIG. 5, is explained.

FIG. 8 shows an illustrative example in which the bitstreams encoded under the above-mentioned conditions are coupled together. In this case, since the trailing portion of the previous first bitstream $BS_1$ has the buffer occupying volume corresponding to α and a startup delay of $\alpha/R_B$ as time version thereof, as a margin, buffer overflow is not induced on coupling the posterior bitstream $BS_2$ to the previous first bitstream $BS_1$. Also, in actual coupling, coupling with optimum matching can be realized by deleting the code sequence_end_code of the last portion f the previous first bitstream $BS_1$ and by stuffing bits to make up for the deleted code sequence end_code and (α-β).

That is, by performing rate control of the trailing portion of the first bitstream $BS_1$ so that, during encoding by the first encoder 10, the buffer occupying volume is suppressed to the overflow level BO(t) employing α, and by encoding the leading portion of the second bitstream $BS_2$ so that the buffer occupying volume β at time $(T'-1/R_F)$ is smaller than α (β<α), buffer overflow is positively prevented from occurring despite seamless coupling. By stuffing invalid data, such as 0, in the difference between α and β, and the code sequence_end_code in the deleted terminal portion of the first bit stream $BS_1$, bitstream coupling can be realized while the MPEG prescriptions of the video buffer verifier (VBV) are met.

In the bitstream coupling unit 30 of FIG. 5, the code sequence_end_code of the last portion of the first bitstream $BS_1$ from the encoding unit 10 is detected by a demultiplexer 31 and sent to a CPU 35, while the code sequence_start_code of the leading portion of the second bitstream $BS_2$ from the encoding unit 20 is detected by a demultiplexer 32 and sent to the CPU 35. The first and second bitstreams $BS_1$, $BS_2$ from these demultiplexers 31, 32 are sent to fixed contacts a, b of a changeover switch 34, respectively, while stuffing bits are supplied from a bit stuffing circuit 33 to a third fixed contact c of the switch 34. This changeover switch 34 is changeover-controlled by the control signal from the CPU 35. This CPU performs control for shifting a movable contact of the switch 34 from the fixed contact a through its fixed contact c to its fixed contact b, based on sequence_end_code of the trailing portion of the first bitstream $BS_1$ or sequence_start_code of the leading portion of the second bitstream $BS_2$ from the demultiplexers 31, 32, deleting sequence_end_code of the trailing portion of the first bitstream $BS_1$ while making up for the code sequence_end_code and the difference α-β with stuffing bits ST from the bit stuffing circuit 33 for coupling to the second bitstream $BS_2$. An output bitstream of the changeover switch 34 is outputted via output terminal 36.

The foregoing description has been made for an instance in which the second bitstream outputted by the encoding unit 20 is coupled to the trailing end of the first bitstream outputted by the encoding unit 10. For coupling the bitstream outputted by the encoding unit 10 to the trailing end of the bitstream outputted by the encoding unit 20, it is sufficient if the buffer occupying volume is suppressed to the overflow level BO(t) employing the buffer volume a in the vicinity of the trailing end of the bitstream outputted by the encoding unit 20 for limiting the encoding by the encoding unit 20, while the buffer occupying volume β at time $(T'-1/R_F)$ at the leading end of the bitstream outputted by the encoding unit 10 is reduced to a value smaller than α (β<α) for limiting encoding by the encoding unit 10. In this case, the demultiplexer 32 of the bitstream coupling unit 30 detects the code sequence_end_code of the trailing end of the bitstream outputted by the encoding unit 20 and transmits the detected code to the CPU 35, while the demultiplexer 31 of the bitstream coupling unit 30 detects the code sequence_start_code of the leading end of the bitstream outputted by the encoding unit 10 and transmits the detected code to the CPU 35. Based on these codes, the CPU 35 performs control for shifting the movable contact of the switch 34 from the fixed contact b through its fixed contact c to its fixed contact a, based on these codes, deleting sequence_end_code of the trailing portion of the bitstream outputted by the encoding unit 20, making up for a number of stuffing bits from the bit stuffing circuit 33 corresponding to the code sequence_end_code and the difference of α–β and interconnecting the bitstream to the bitstream outputted by the encoding unit 10 to output the resulting bitstream at an output terminal 36.

Figure 2:
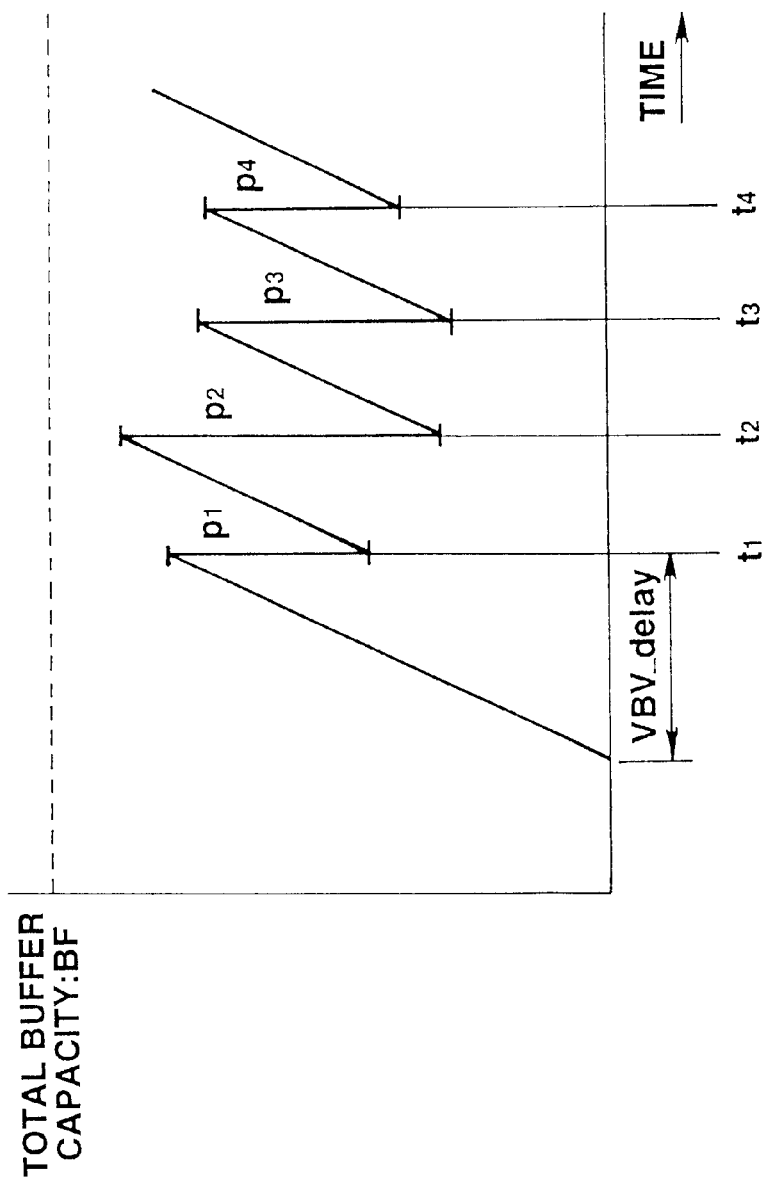
FIG. 2 shows changes in the amount of storage of a reception buffer (decoder buffer).
Figure 3:
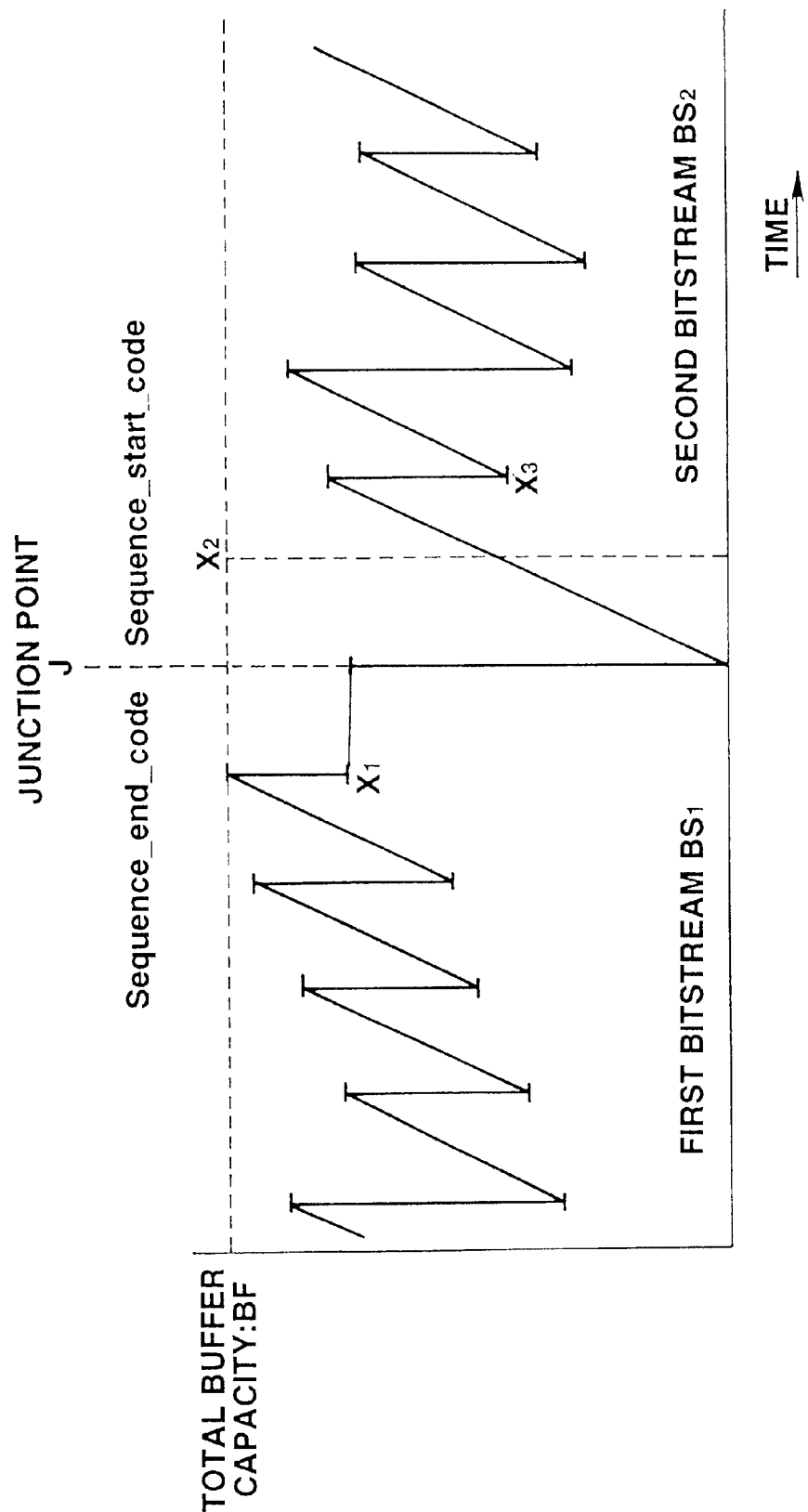
FIG. 3 illustrates an instance of coupling accompanying freezing (coming to standstill) of frames of two bitstreams.
Figure 4:
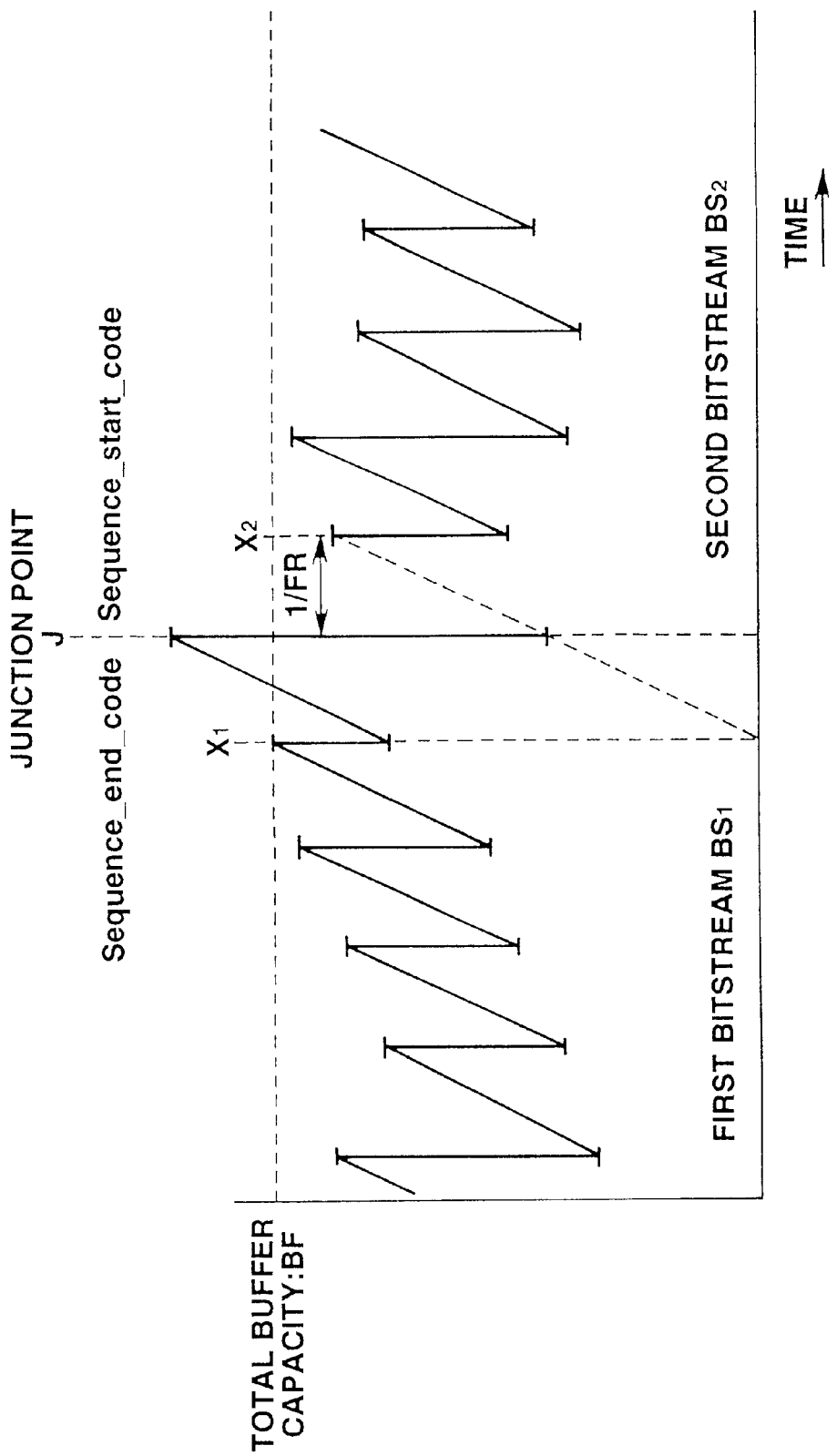
FIG. 4 illustrates an instance of seamless coupling two bitstreams.

On the other hand, by encoding the leading portion of the sole bitstream outputted by the encoding unit 10 under the limitations shown in FIG. 7, and by encoding the trailing portion of the same bitstream under limitations shown in FIG. 2, it becomes possible to connect other bitstreams to the leading and trailing ends of the output bitstream of the encoding unit 10.

An illustrative example of a system for applying the arrangement of FIG. 5 is a broadcasting network in which a main broadcasting station and a local broadcasting station are interconnected by, for example, a broadcasting satellite. In this broadcasting network, programs from the main broadcasting station are encoded by the encoding unit 10 and offered to each local station, which then couples the regional local news or CM, encoded by the encoding unit 20, to the encoded programs. The resulting combined programs are taken out at the output terminal and sent to each area. At this time, the trailing end of the bitstream of the broadcasting program from the main station is encoded under the limitation that the buffer occupying volume is not more than $BO(t)=BF-R_\beta t$ as explained with reference to FIG. 6, while the leading end of the bitstream of the signal from the local station, coupled to the trailing end of the bitstream from the main station, is encoded under the limitation that the buffer occupying volume β at the time point $(T'-1/R_F)$ is not more than the buffer volume α (β<α), as explained with reference to FIG. 7. The resulting bitstream, produced by seamlessly coupling the two bitstreams with bit stuffing by the coupling unit 30, is free from buffer disruption, that is buffer overflow or underflow, at the time of decoding.

In the above-described embodiments, two video bitstreams, produced on encoding (compressing) picture signals in accordance with the MPEG1 (ISO11172-2) or MPEG2 (ISO13818-2), can be seamlessly coupled together in meeting with the VBV prescriptions so that pictures will be displayed in succession without freezing (coming to standstill).

According to the present invention, in coupling plural bitstreams, first pre-set limitations are imposed on the decoder buffer occupying volume in the vicinity of the trailing end of the first bitstream ahead of the junction point, while second pre-set limitations are imposed on the decoder buffer occupying volume in the vicinity of the leading end of the second bitstream at back of the junction point, thus realizing seamless coupling without buffer disruption.

These first and second limitations are those for securing the decoder buffer volume necessary for startup of the second bitstream. By coupling the first and second bitstreams, encoded under these limitations, the two bitstreams, encoded in accordance with the MPEG1 (ISO11172-2) or MPEG2 (ISO13818-2), can be seamlessly coupled together in meeting with the VBV prescriptions so that pictures will be displayed in succession without freezing (coming to standstill).

What is claimed is:

1. A digital signal encoding apparatus for encoding and coupling temporally sequential bitstreams for transmission, comprising:

a first encoder having a first transmission buffer for encoding first picture signals at a first bit rate into a first bitstream;

a second encoder having a second transmission buffer for encoding second picture signals at a second bit rate into a second bitstream;

a bitstream coupling unit for seamlessly coupling the first bitstream and the second bitstream to provide an output bitstream for seamless and continuous display of said first and second picture signals;

the first encoder adjusting the first bit rate to limit an amount of encoded data of the first bitstream in said first transmission buffer for the last of said first picture signals to prevent an overflow/underflow condition in the first transmission buffer at a junction between the coupled first and second bitstreams; and the second encoder adjusting the second bit rate to limit an amount of encoded data of the second bitstream in said second transmission buffer for the first of said second picture signals to prevent an overflow/underflow condition in the second transmission buffer at a junction between the coupled first and second bitstreams.

2. The digital signal encoding apparatus according to claim 1, wherein said amount of encoded data of the first bitstream in said first transmission buffer for the last of said first picture signals is limited to a total size of said first transmission buffer less the adjusted first bit rate multiplied by the time remaining to said junction.

3. The digital signal encoding apparatus according to claim 1, wherein said amount of encoded data of the second bitstream in said second transmission buffer for the first of said second picture signals is limited to a total size of said second transmission buffer less the adjusted second bit rate multiplied by the elapsed time after said junction.

4. The digital signal encoding apparatus according to claim 1, wherein said bitstream coupling unit comprises:

a first demultiplexer for demultiplexing said first bitstream;

a second demultiplexer for demultiplexing said second bitstream;

a switch for switching between said first demultiplexer and said second demultiplexer; and a processor for controlling the switch to searmlessly couple the first bitstream and the second bitstream, thereby providing an output bitstream for continuous display of said first and second picture signals.

5. A digital signal encoding method of encoding and coupling temporally sequential bitstreams for transmission, comprising the steps of:

encoding first picture signals at a first bit rate into a first bitstream using a first encoder having a first transmission buffer;

adjusting the first bit rate to limit an amount of encoded data of the first bitstream in said first transmission buffer for the last of said first picture signals to prevent an overflow/underflow condition in the first transmission buffer;

encoding second picture signals at a second bit rate into a second bitstream using a second encoder having a second transmission buffer;

adjusting the second bit rate to limit an amount of encoded data of the second bitstream in said second transmission buffer for the first of said second picture signals to prevent an overflow/underflow condition in the second transmission buffer; and coupling the first bitstream and the second bitstream to provide an output bitstream for seamless and continuous display of said first and second picture signals.

6. The digital signal encoding method according to claim 5, wherein said amount of encoded data of the first bitstream in said first transmission buffer for the last of said first picture signals is limited to a total size of said first transmission buffer less the adjusted first bit rate multiplied by the time remaining to a junction between the coupled first and second bitstreams.

7. The digital signal method apparatus according to claim 5, wherein said amount of encoded data of the second bitstream in said second transmission buffer for the first of said second picture signals is limited to a total size of said second transmission buffer less the adjusted second bit rate multiplied by the elapsed time after a junction between the coupled first and second bitstreams.

8. The digital signal method apparatus according to claim 5, wherein said coupling step, comprises the steps of:

demultiplexing said first bitstream using a first demultiplexer;

demultiplexing said second bitstream using a second demultiplexer; and switching between said first demultiplexer and said second demultiplexer to seamlessly couple the first bitstream and the second bitstrearn, thereby providing an output bitstream for continuous display of said first and second picture signals.

* * * * *